US009576436B2

(12) United States Patent
Jackson

(10) Patent No.: US 9,576,436 B2
(45) **Date of Patent: *Feb. 21, 2017**

(54) CARD SELECTION GAME WITH FEATURE

(71) Applicant: Aristocrat Technologies Australia Pty Limited, North Ryde (AU)

(72) Inventor: Robert Jackson, Lane Cove (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 848 days.

This patent is subject to a terminal disclaimer.

(21) Appl. No.: 13/869,626

(22) Filed: Apr. 24, 2013

(65) Prior Publication Data

US 2013/0237305 A1 Sep. 12, 2013

Related U.S. Application Data

(63) Continuation of application No. 12/686,073, filed on Jan. 12, 2010, now Pat. No. 8,449,371, which is a continuation of application No. 11/761,778, filed on Jun. 12, 2007, now Pat. No. 8,075,385.

(30) Foreign Application Priority Data

Jun. 13, 2006 (AU) ................................ 2006903185

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ....... *G07F 17/3293* (2013.01); *G07F 17/3267* (2013.01)

(58) Field of Classification Search
CPC ...... A63F 13/00; A63F 2001/00; G07F 17/32; G07F 17/326; G07F 17/3262; G07F 17/3244; G07F 17/3255; G07F 17/3258; G07F 17/3293; G07F 17/3295
USPC ........................................ 463/16, 17, 19, 20
See application file for complete search history.

(56) References Cited

U.S. PATENT DOCUMENTS

| | | | |
|---|---|---|---|
| 6,334,614 | B1 | 1/2002 | Breeding |
| 6,435,511 | B1 | 8/2002 | Vancura et al. |
| 6,582,307 | B2 | 6/2003 | Webb |
| 6,669,559 | B1 | 12/2003 | Baerlocher et al. |
| 7,073,793 | B2 | 7/2006 | Vancura |
| 7,234,700 | B2 | 6/2007 | Vancura |
| 2007/0149267 | A1 | 6/2007 | Ross et al. |
| 2009/0275381 | A1 | 11/2009 | Bennett |

*Primary Examiner* — Kevin Y Kim
*Assistant Examiner* — Shahid Kamal
(74) *Attorney, Agent, or Firm* — McAndrews, Held & Malloy, Ltd.

(57) ABSTRACT

A gaming machine and method are disclosed. A selected symbol is displayed in a non-revealed manner, for example on a display, a player having nominated at least one characteristic of the symbol. If the selected symbol is revealed to have the nominated characteristic a prize is awarded to the player, and if the symbol is revealed to be a special symbol a game controller awards the player a feature outcome that comprises a plurality of bonus plays of a feature game that includes at least one special symbol. Progression to the next bonus play in the plurality of bonus plays is dependent on selection of the special symbol.

5 Claims, 9 Drawing Sheets

CARD SELECTION GAME WITH FEATURE

RELATED APPLICATIONS

This application is a continuation of Ser. No. 12/686,073, having a filing date of Jan. 12, 2010, which is a continuation of, and claims priority to, U.S. patent application Ser. No. 11/761,778, having a filing date of Jun. 12, 2007, and claims priority to Australian Patent Application No. AU2006903185, having an international filing date of Jun. 13, 2006, entitled "Card Selection Game With Feature", which is hereby incorporated by reference herein in its entirety.

FIELD OF THE INVENTION

The present invention relates to gaming apparatus and methods of gaming. In particular, the present invention relates to a card type game played on a gaming machine in which a player guesses a characteristic of a card, and if the guess is correct, the player is awarded a prize.

BACKGROUND OF THE INVENTION

With the increase of gambling at gaming venues has come increased competition between gaming venues to obtain a larger share of the total gambling spend. Gaming venue operators have therefore continuously looked for new variations and types of games in order to attract both new and return customers to their venues.

In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming apparatus that are allowable, both in terms of the prevailing regulations and in terms of providing a return on investment to the gaming venue operators.

In addition, it is important that a player be able to understand the operation of a game quickly so that the player promptly feels that they are in control of game play and can therefore extract maximum entertainment from the game.

Games are known in which a player is invited to guess a characteristic of a symbol which is then revealed to indicate whether the guess is right, and if so, the player is awarded a prize. One such game, for example, is a card game in which a player is invited to guess whether a card is red or black. The player is typically awarded a prize of twice the wager if the guess is right, and loses the entire wager if the guess is wrong. A problem with this game is that the return to player is on average 100% of the wager, that is, the house does not receive a percentage of the wager over time. A further problem with this type of game is that providing a jackpot prize in the game is not possible without further increasing the return to player percentage of the game. A yet further problem is that the game tends to be somewhat limited, and players therefore quickly tire of the playing the game.

Any reference in this specification to the prior art does not constitute an admission that such prior art was well known or forms part of the common general knowledge in any jurisdiction.

BRIEF SUMMARY OF THE INVENTION

According to a first aspect of the invention, there is provided a gaming machine comprising a display and a game controller which will enable a player to stake a wager on the outcome of a wagering game controlled by the game controller played on the machine, the wagering game comprising a base game during the play of which at least one symbol is randomly selected by the game controller from a first set of symbols comprising a plurality of standard symbols and at least one special symbol, and the selected symbol is displayed in a non-revealed manner in a display position on the display, the gaming machine having a symbol characteristic nominator by means of which the player is able to nominate at least one characteristic of a symbol, the nomination of the characteristic occurring either before or after the selection of the symbol, the game controller being adapted to reveal the characteristic of the selected symbol after said nomination by displaying the symbol in the display position, and if the selected symbol is revealed to have the nominated characteristic a prize is awarded to the player, and if the symbol is revealed to be a special symbol the game controller awards the player a feature outcome that comprises a plurality of bonus plays of a feature game in each of which a selection is made from one or more second sets of symbols that each comprise at least one special symbol, and wherein progression to the next bonus play in the plurality of bonus plays is dependent on the selection of a special symbol in the current bonus play, wherein at least one feature award is awardable from the feature game and in at least one of the plurality of bonus plays at least one aspect of the base game has been changed.

In one embodiment, the at least one aspect of the base game that has been changed comprises the one or more second symbol sets being different from the first symbol set and wherein the second symbol set is also changed between at least two of the plurality of bonus plays.

In one embodiment, the at least one aspect of the base game that has been changed affects the probability of the game controller selecting a said special symbol and wherein the award of a prize is dependent on the occurrence of a certain number of special symbols in the feature game.

In one embodiment, the feature game will only award prizes when the revealed symbol is a special symbol.

In one embodiment, at least one jackpot prize is awardable from the feature game. The jackpot prize may be awarded dependent on the selection of a special symbol in the feature game. Also, the player's chance of winning the jackpot may be dependent on the size of the wager made in the base game, the chance of being awarded the jackpot being varied for different wager amounts by altering the relative number of special symbols in a said second set of symbols from which the potentially jackpot winning selection is made. In this regard, the second set of symbols from which the potentially jackpot winning selection is made may be the set of symbols from which a selection is made from in the last of the plurality of bonus plays. The jackpot may be a progressive prize to which the gaming machine contributes.

In one embodiment, during play of the base game a plurality of symbols are randomly selected by the game controller from the one or more second sets of symbols and wherein the symbol characteristic nominator enables the player to nominate at least one characteristic of each of the selected symbols and wherein if any one of the selected symbols is revealed to be a said special symbol, the game controller awards the player the feature outcome.

In one embodiment, there are a plurality of symbol display positions and the gaming machine includes a player operable position selector for selecting how many of said positions will have symbols revealed therein. The game controller may be adapted to increase the awards to the player during the feature if the player is awarded the feature outcome at more than one display position. If more than one special symbol is selected and revealed in the base game, then a multiplier may be applied to at least one said feature award when that prize is won during the feature game.

In one embodiment, in each bonus play at least one symbol is randomly selected by the game controller from a said second set of symbols and wherein the second set of symbols comprises a plurality of standard symbols and at least one special symbol, and the selected symbol is displayed in a non-revealed manner in a display position on the display, and wherein the player operates the nominator to nominate at least one characteristic of a symbol, the nomination of the characteristic occurring either before or after the selection of the symbol, the game controller being adapted to reveal the characteristic of the selected symbol after said nomination by displaying the symbol in the display position, and if the selected symbol is revealed to have the nominated characteristic a said feature award is awarded to the player. The at least one characteristic of a symbol able to be nominated by the nominator in each bonus play may comprise the same characteristics able to be nominated in the base game.

In one embodiment, each said second set of symbols has a higher proportion of special symbols to standard symbols than in the first set of symbols.

In one embodiment, the aspect of the base game which is changed comprises a change to the prizes awarded to the player.

In one embodiment, the gaming machine comprises a player operable wager selector for varying the wager on each play of the base game and in which the game controller awards a prize where the revealed symbol is a standard symbol with the nominated characteristic, the amount of the prize being a factor times the size of the wager, where the factor is related to the relative number of standard symbols in the set which include that characteristic. During play of the feature game the game controller may award a prize where the revealed symbol is a standard symbol with the nominated characteristic, the amount of the prize being a factor times the size of the wager staked on the base game, where the factor is related to the relative number of standard symbols in the set which include that characteristic.

In one embodiment, in the first set of symbols the special symbols comprise the same characteristics as the standard symbols, and the game controller is adapted to only award the player the feature game when the special symbol selected by the game controller has the nominated characteristic.

In one embodiment, the symbols are in the form of cards and the nominated characteristic is the colour of the cards. In the base game the standard symbols may be a standard playing deck of 52 cards having 26 red cards and 26 black cards and the special symbols are jokers, and wherein the jokers are either red jokers or black jokers.

In one embodiment, the special symbols in the base game and the feature game are the same.

According to a second aspect of the invention, there is provided a gaming machine comprising a display and a game controller which will enable a player to stake a wager on the outcome of a wagering game controlled by the game controller played on the machine, the wagering game comprising a base game during the play of which at least one symbol is randomly selected by the game controller from a first set of symbols comprising a plurality of standard symbols and at least one special symbol, and the selected symbol is displayed in a non-revealed manner in a display position on the display, the gaming machine having a symbol characteristic nominator by means of which the player is able to nominate at least one characteristic of a symbol, the nomination of the characteristic occurring either before or after the selection of the symbol, the game controller being adapted to reveal the characteristic of the selected symbol after said nomination by displaying the symbol in the display position, and if the selected symbol is revealed to have the nominated characteristic a prize is awarded to the player, and if the symbol is revealed to be a special symbol the game controller awards the player a feature outcome that comprises a plurality of bonus plays of a feature game in which a plurality of symbols are selected displayed in a non-revealed manner in a plurality of symbol positions, the selection being made from one or more second sets of symbols that each comprise at least one special symbol, the gaming machine having a symbol position nominator by means of which the player is able to nominate one of the symbol positions, and wherein progression to the next bonus play in the plurality of bonus plays is dependent on the player nominating a symbol position in which a special symbol has been displayed in a non-revealed manner.

In one embodiment, if special symbols are selected in n consecutive bonus plays, then the gaming machine awards a jackpot prize.

According to a third aspect of the invention, there is provided a method of providing a wagering game comprising:

commencing a game play by receiving from a player a wager staked on the outcome of the wagering game and a selection from at least two possible selections for a characteristic of a symbol that forms part of the wagering game;

selecting a symbol from a set of a plurality of symbols that comprises symbols with characteristics that match one or other of the at least two possible selections and comprises at least one trigger symbol, and displaying the selected symbol after the selection of a characteristic has been received from the player;

if the selected symbol is a trigger symbol, then providing a feature game in which:

a) a symbol is selected and displayed, wherein the displayed symbol has been selected from a plurality of symbols including at least one progression symbol, according to random criteria;

b) if a progression symbol is displayed, repeating process a) until either a progression is not revealed, or until n cycles or processes a) and b) have been completed, where n is a fixed number and is at least 2; and d) if a progression symbol is not revealed or n cycles have been completed, ending the current game play; and if the selected symbol has characteristics that match the characteristic received from the player, awarding an award to the player without completing processes a) to e).

According to a fourth aspect of the invention, there is provided a method of providing a wagering game comprising:

commencing a game play by receiving from a player a wager staked on the outcome of the wagering game and a selection from at least two possible selections for a characteristic of a symbol that forms part of the wagering game;

selecting a symbol from a set of a plurality of symbols that comprises symbols with characteristics that match one or other of the at least two possible selections and comprises at least one trigger symbol, and displaying the selected symbol after the selection of a characteristic has been received from the player;

if the selected symbol is a trigger symbol, then:

a) displaying a plurality of choices to a player and receiving from the player a selection of one of the choices;

b) revealing a symbol associated with the choice, wherein the revealed symbol has been selected from a plurality of symbols including at least one progression symbol, according to random criteria;

c) if a progression symbol is revealed, repeating processes a) and b) until either a progression is not revealed, or until n cycles or processes a) and b) have been completed, where n is a fixed number and is at least 2;

d) if a progression symbol is not revealed, ending the current game play without awarding a jackpot prize; and e) if n cycles have been completed, awarding a jackpot prize and ending the current game play;

if the selected symbol has characteristics that match the characteristic received from the player, awarding an award to the player without completing processes a) to e).

In one embodiment, the processes of commencing a game play by receiving from a player a wager staked on the outcome of the wagering game and a selection from at least two possible selections for a characteristic of a symbol that forms part of the wagering game; and selecting a symbol from a set of a plurality of symbols that comprises symbols with characteristics that match one or other of the at least two possible selections and comprises at least one trigger symbol, and displaying each selected symbol after the selection of a characteristic has been received from the player;

are both repeated a plurality of times and wherein processes a) to e) are completed if any one of the selected symbols is a trigger symbol.

Further aspects of the present invention and further embodiments of the aspects described in the preceding paragraphs will become apparent from the following description, given by way of example and with reference to the accompanying drawings.

DETAILED DESCRIPTION OF THE INVENTION

Figure 1:
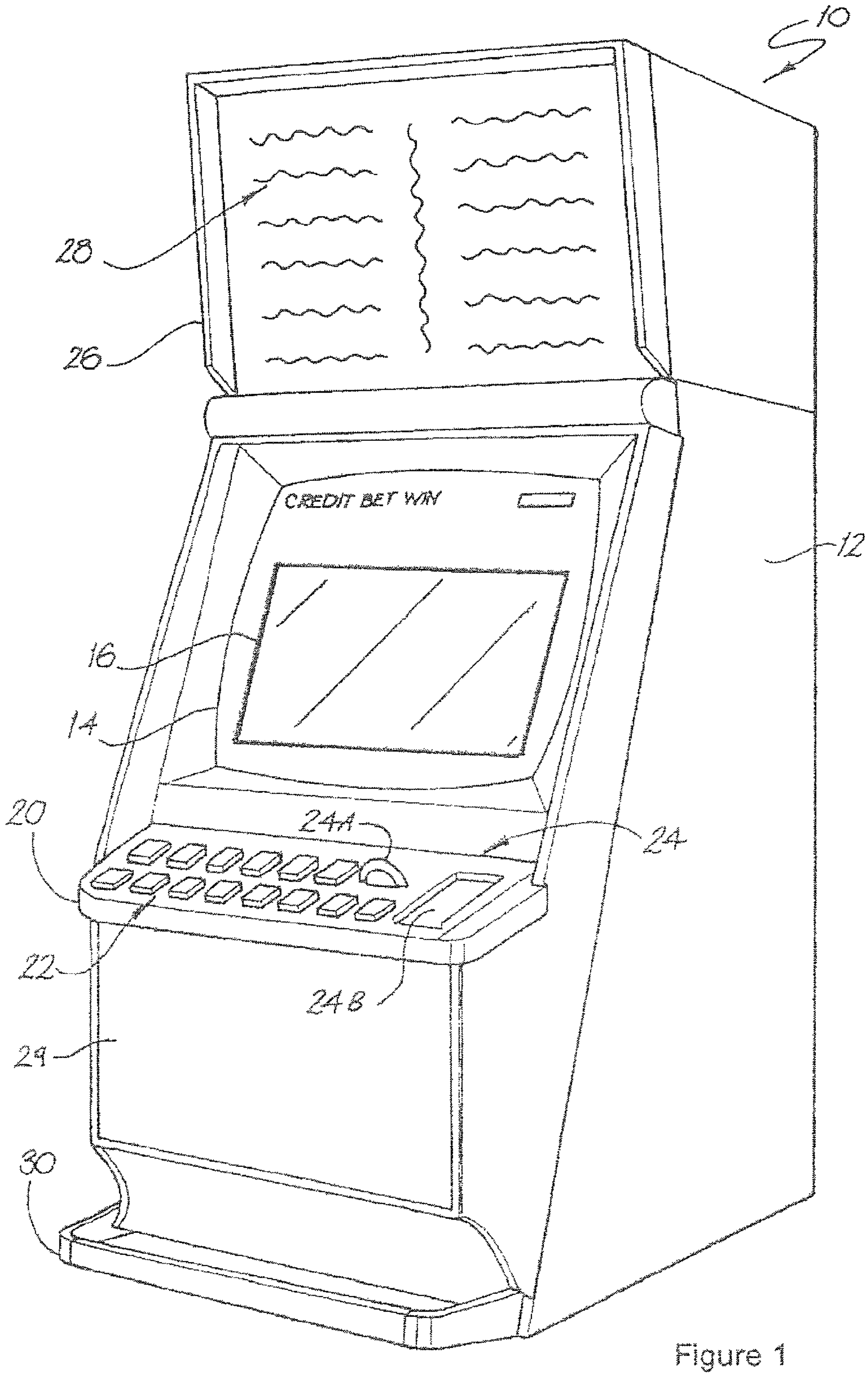
FIG. 1 shows diagrammatically, a view of a gaming machine suitable for implementing certain embodiments of the present invention.

In FIG. 1 of the accompanying drawings, one example of a gaming machine suitable for implementing certain embodiments of the present invention is generally referenced by arrow 10.

The gaming machine 10 includes a console 12 having a display 14 on which is displayed representations of a game 16, that can be played by a player. A mid-trim 20 of the gaming machine 10 houses a bank of buttons 22 for enabling a player to play the game 16. The mid-trim 20 also houses a credit input mechanism 24 including a coin input chute 24A and a bill collector 24B. A top box 26 may carry artwork 28, including for example, pay tables and details of bonus awards and other information or images relating to the game. Further artwork and/or information may be provided on the front panel 29 of the console 12. A coin tray 30 is mounted beneath the console 12 for cash payouts from the gaming machine 10.

The display 14 shown in FIG. 1 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or a different type of display.

Figure 2:
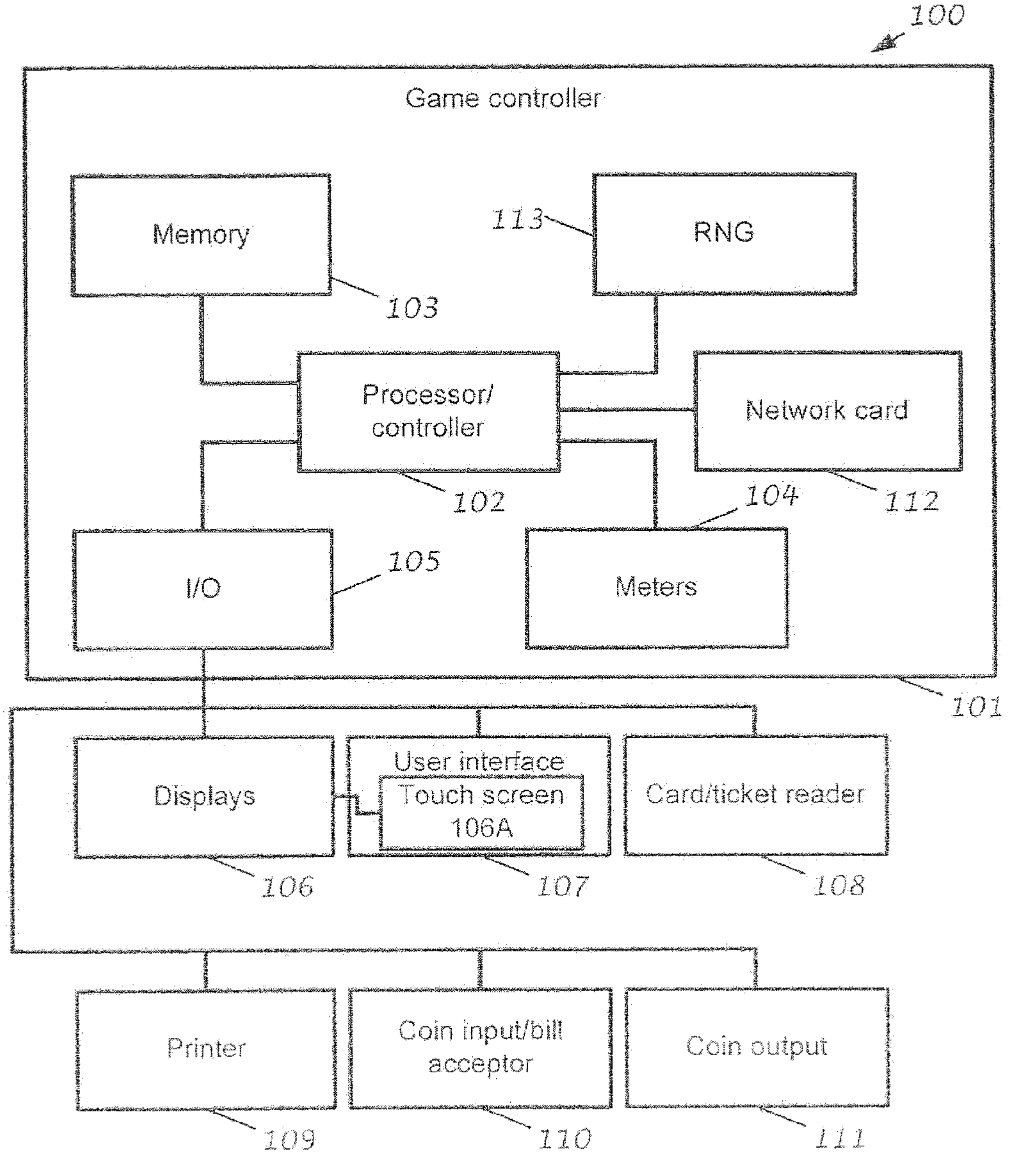
FIG. 2 shows a block diagram of gaming apparatus suitable for implementing certain embodiments of the present invention.

FIG. 2 shows a block diagram of a gaming apparatus, generally referenced by arrow 100, suitable for implementing certain embodiments of the present invention. The gaming apparatus 100 may, for example, operate as a standalone gaming machine of the type shown in FIG. 1. However, the gaming apparatus 100 may alternatively operate as a networked gaming machine, communicating with other network devices, such as one or more servers or other gaming machines. The gaming apparatus 100 may also have distributed hardware and software components that communicate with each other directly or through a network. Accordingly, different reference numerals have been used in FIG. 2 from FIG. 1 for components that may be equivalent.

The gaming apparatus 100 includes a game controller 101, which in the illustrated example includes a microprocessor, microcontroller, programmable logic device or other computational device 102. Instructions and data to control operation of the computational device 102 are stored in a memory 103, which is in data communication with or forms a part of the computational device 102. Typically, the gaming apparatus 100 will include both volatile and non-volatile memory and more than one of each type of memory, with such memories being collectively represented by the memory 103. The instructions to cause the game controller 101 to implement the present invention will be stored in the memory 103.

The gaming apparatus may include hardware meters 104 for the purposes of regulatory compliance and also include an input/output (I/O) interface 105 for communicating with the peripheral devices of the gaming apparatus 100. The input/output interface 105 and/or the peripheral devices may be intelligent devices with their own memory for instructions and data.

In the example shown in FIG. 2, the peripheral devices that communicate with the controller are one or more displays 106, user interfaces 107, a card and/or ticket reader 108, a printer 109, a bill acceptor and/or coin input mechanism 110 and a coin output mechanism 111. One or more of the displays 106 may include a touch screen 106A, forming part of the user interface 107. Additional devices may be included as part of the gaming apparatus 100, or devices omitted as required for the specific implementation.

In addition, the gaming apparatus 100 may include a communications interface, for example a network card 112. The network card, may for example, send status information, accounting information or other information to a central controller, server or database and receive data or commands from a the central controller, server or database. As explained in more detail in relation to FIG. 4, the computational device 102 may include two or more controllers or processors, which may be local or remote from each other and the displays 106.

Figure 3:
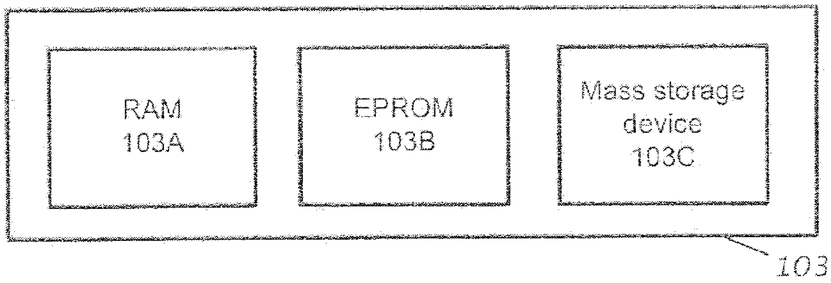
FIG. 3 shows a block diagram of components of the memory of the gaming apparatus represented in FIG. 2.

FIG. 3 shows an exemplary block diagram of the main components of the memory 103. The RAM 103A typically temporarily holds program files for execution by the computational controller 102 and related data. The EPROM 103B may hold be a boot ROM device and/or may contain some system or game related code. The mass storage device 103C is typically used to store game programs, the integrity of which may be verified and/or authenticated by the computational controller 102 using protected code from the EPROM 103B or elsewhere.

Figure 4:
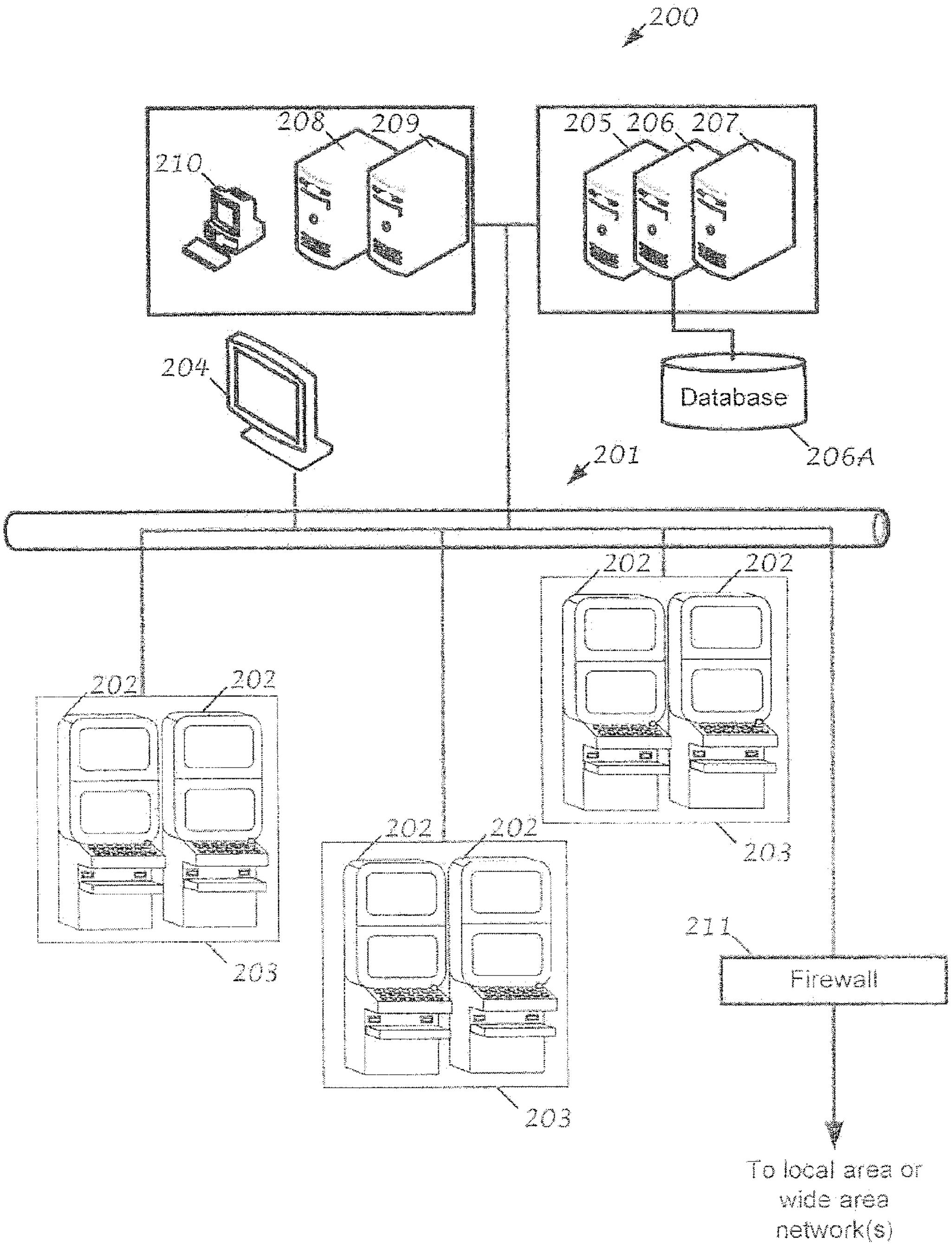
FIG. 4 shows diagrammatically, a network gaming system suitable for implementing certain embodiments of the present invention.
Figure 5:
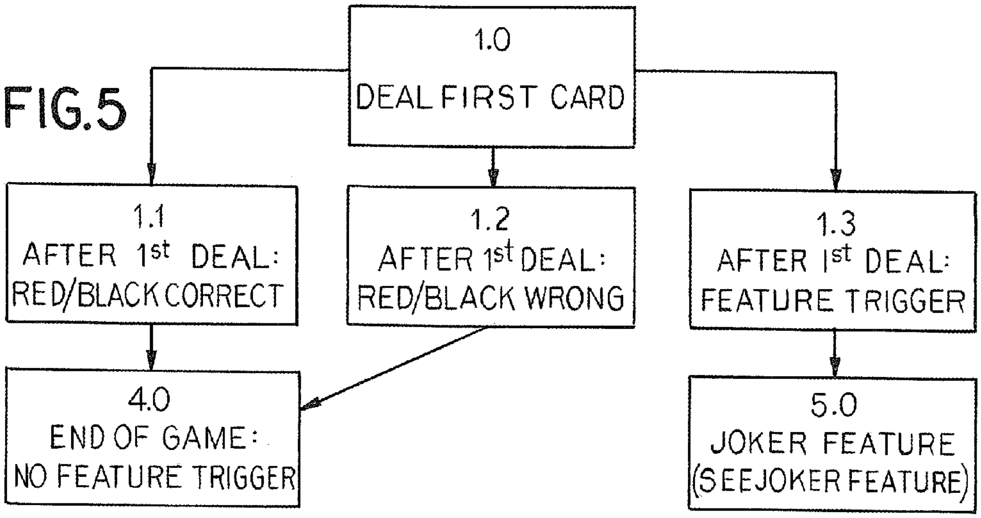
FIGS. 5 to 8 show block diagrams of how the game is played on a machine according to certain embodiments of the present invention.

FIG. 4 shows a gaming system 200. The gaming system 200 includes a network 201, which for example may be an Ethernet network. Gaming devices 202, shown arranged in three banks 203 of two gaming devices 202 in FIG. 4, are connected to the network 201. The gaming devices 202 may be gaming machines 10, as shown in FIG. 1 or form part or all of another gaming apparatus 100. Single gaming devices 202 and banks 203 containing three or more gaming devices 202 may also be connected to the network 201.

One or more displays 204 may also be connected to the network 201. The displays 204 may, for example, be associated with a bank 203 of gaming devices. The displays 204 may be used to display representations associated with game play on the gaming devices 202, and/or used to display other representations, for example promotional or informational material.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

An example of a game which is played on a gaming machine according to the invention will now be described in detail. Reference is initially made to FIGS. 5 to 8 of the drawings.

The game is a card game where the player bets 1 to 5 credits per card on between 1 and 3 cards, and then chooses Red or Black for each card. The cards are dealt face down, and the player selects Red or Black for each card. If Red/Black choice is correct for any card, the player wins double their bet. There is also a feature outcome that is triggered whenever a joker of the correct colour is dealt. The feature outcome will be described in more detail below.

The game may be played with a wager of 1, 2, 3, 4 or 5 credits per card. The maximum bet is 15 credits (that is, 5 credits×3 cards). The value of a credit can be varied, but would typically be fixed for a particular machine. The currency of the credits would typically be the currency of the establishment where the machine was located.

The base game uses a standard 52 card deck to which a number of jokers are added to the deck. Thus, the 52 card deck plus the jokers make up the available "symbols" or cards that can be drawn in each card position.

The machine is provided with a DEAL button, which may be provided in the bank of buttons 22. The play starts with the player pressing the DEAL button. Bet and number of cards selection would typically be made before pressing the DEAL button. Once the cards have been dealt face down, the player is invited to select whether each card is red or black. A button in the bank of buttons 22, or alternatively on the touch screen 106A, is provided to enable the player to make the selection.

The following message is to appear while waiting for the player to press DEAL:

| | |
|---|---|
| Message line 1 | Press DEAL to Start Game |
| Message line 2 | Game Over/x credits per card |

After pressing DEAL, the game follows one of the flowcharts, shown in FIGS. 5 to 8, based on the number of cards played. Each entry in the flowchart is fully explained below. Flowchart 5 applies where the player plays one card, flowchart 6 applies where the player plays 2 cards, flowchart 7 applies where the player plays 3 cards, and flowchart 8 applies to the entire game.

As shown in flowchart 5, one card is dealt to the player face down. (Note that the onscreen position of the card depends on how many cards the player has selected.) The machine is provide with a credit meter which is decreased by the Total Bet as the card is dealt. (For example, if the player is betting 4 credits per card and has chosen to play two cards, then the Total Bet is 8 credits.)

The following message appears with RED and BLACK buttons flashing:

| | |
|---|---|
| Message line 1 | Choose RED or BLACK |
| Message line 2 | x credits per card |

The player can then select either RED or BLACK for the dealt card. Pressing any other button has no effect. The relevant card is turned over once the player has made a selection. Red/Black graphical display will clearly indicate player's Red or Black selection. Thus, after the player has made the selection the card is turned over, revealing whether the selection made was correct.

If the card turned over is non-joker and it matches the player's Red/Black selection, the player wins 2 times their bet per card. This win amount is shown on the Win meter. If the player is playing one card only, the game is now over. See block 4.0 in FIG. 5.

If the selection is incorrect there is no win for this card. This includes turning over a joker of the wrong colour (note that in this embodiment only a joker that is the same colour as the player's selection will trigger the feature). If the player is playing one card only, the game is now over with no Feature Trigger (see block 4.0 in FIG. 5).

If the selection is a joker of the player's chosen colour, then this is known as a Joker Trigger. If the player is only playing one card, then the Joker Feature commences immediately (see FIG. 8 which shows the flowchart for the feature outcome).

If the player is playing two or three cards, an onscreen graphical display showing that a feature has been triggered appears. This is called herein the Feature Trigger display, and in this case it will indicate that there has been one Feature Trigger.

Figure 6:
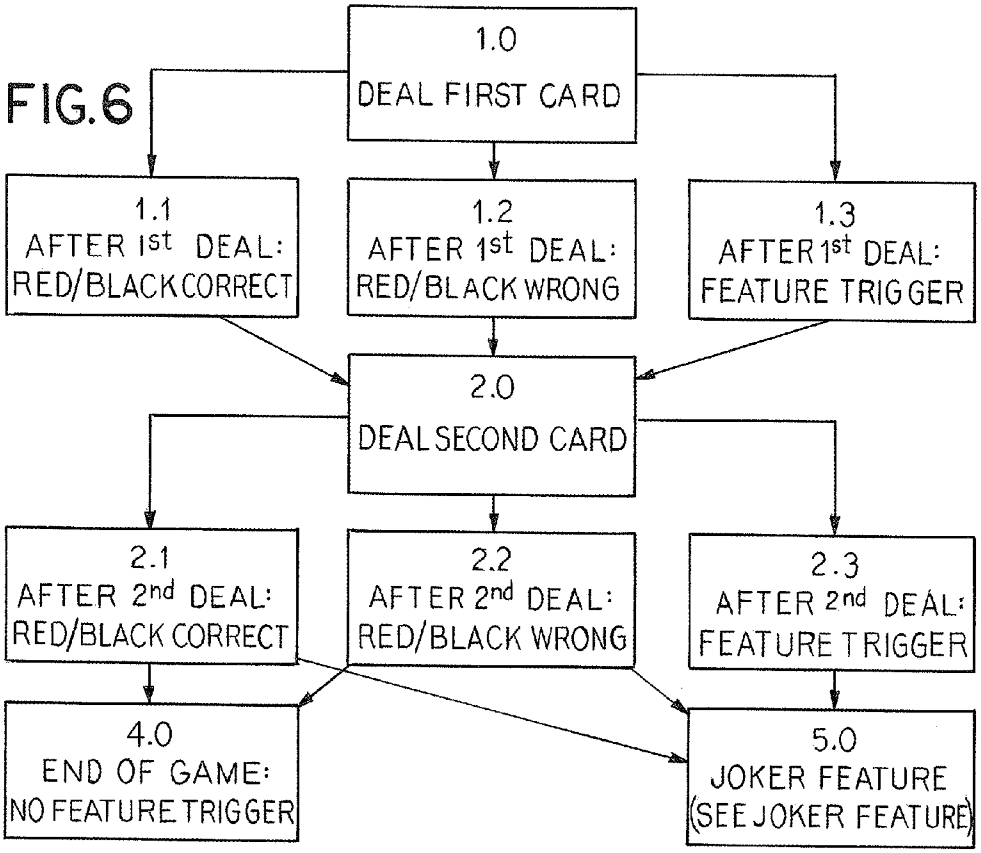

If the player is playing two cards, reference can be made to FIG. 6. Block 2.0 indicates the drawing of the second card. A second card is dealt to the player face down. The following message appears with RED and BLACK buttons flashing:

| | |
|---|---|
| Message line 1 | Choose RED or BLACK |
| Message line 2 | x credits per card |

The player can then select either RED or BLACK for the second dealt card. Pressing any other button has no effect. The card is to turn over once player has made a selection. Red/Black graphical display is to clearly indicate player's Red or Black selection. Go to blocks 2.1, 2.2 or 2.3, in FIG. 6, depending on which card has been revealed.

If the card turned over is non-joker and it matches the player's Red/Black selection, the player wins 2 times their bet per card. This win amount is to increment onto the Win meter. (This is in addition to any win from the first card.) If player is playing two cards, the game is now over and the process proceeds to block 4.0 in FIG. 6 if there was no Joker Trigger on the first deal. If the first deal was a Joker Trigger, then the process proceeds to block 5.0.

Figure 7:
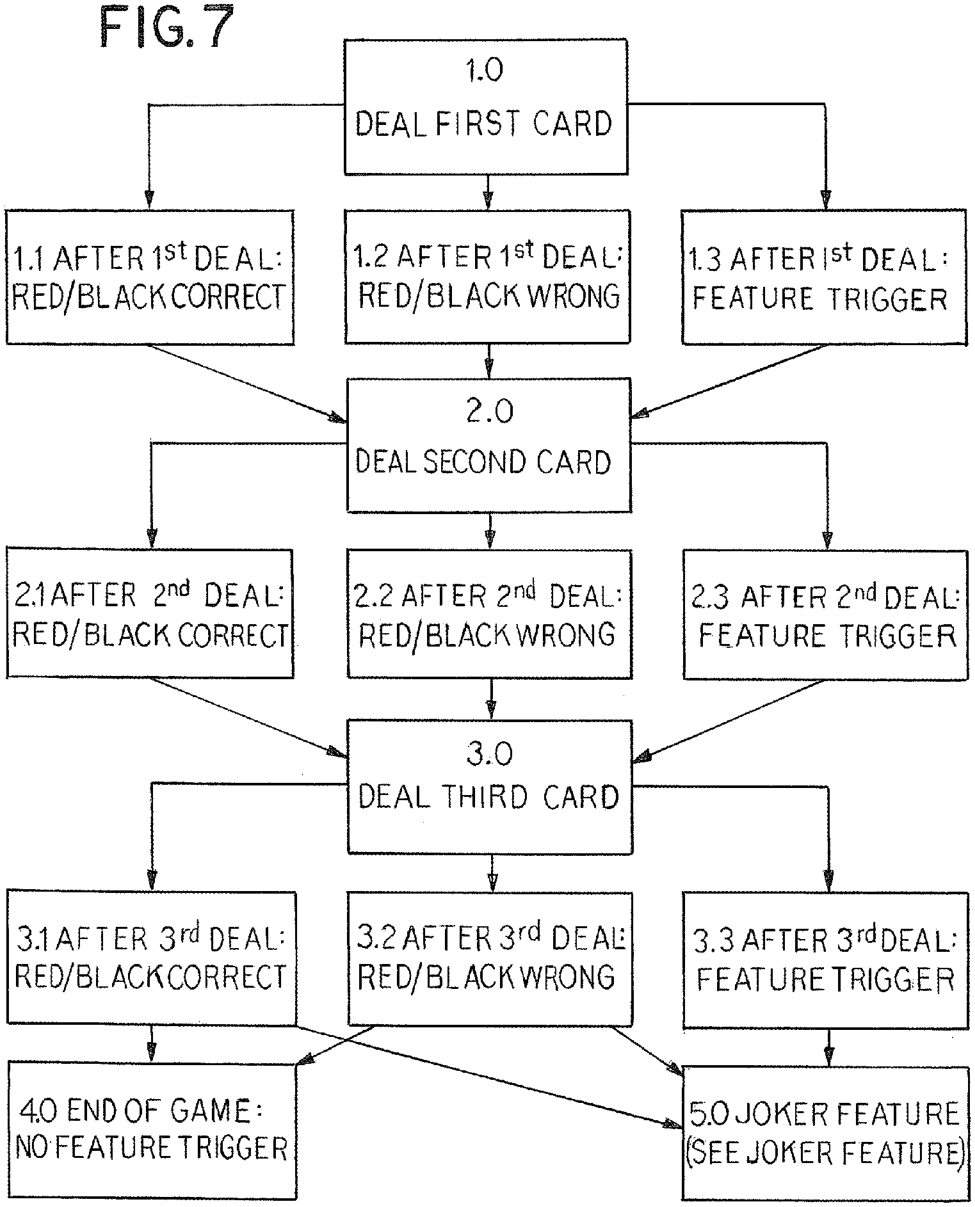

If, however, the player is playing three cards, then the process proceeds to block 3.0 in FIG. 7.

If the selection is incorrect there is no win for this card. This includes turning over a joker of the wrong colour. If player is playing two cards, the game is now over.

If the selection of the second card is a joker of the player's chosen colour, then this is a Joker Trigger. If the player is playing two cards, then the joker Feature commences immediately. Note that if this is the player's first Joker Trigger, then the Feature is won with a single Feature Trigger. If, however, the player has drawn Joker Triggers in both the first and second deals, then the feature has been won with two Feature Triggers (any credit wins during the feature game are multiplied by the number of Feature Triggers). In the event of two Joker Triggers being dealt, the onscreen Feature Trigger display will update to indicate that there are now two Feature Triggers.

The three card game is thus much the same as the two card game, with the third card selection being made after completion of the second card outcome. Any Joker Triggers which occur in the play of the first, second or third cards are displayed. If at least one Joker Trigger occurred during the play of any one of those cards, the feature game will then be played after the third card has been revealed. Reference may now be made to the feature game disclosed in flowchart 8.

It should be noted that if the player has had a credit win during the game (that is, the correct Red/Black card selection), then GAMBLE, TAKE WIN and DEAL buttons are set to flash. Relevant BET and CHOOSE CARD buttons are to be lit. The following messages are displayed on the screen:

| | |
|---|---|
| Message line 1 | |
| Message line 2 | PLAY ON, GAMBLE or TAKE WIN/x credits per card |

The player now has a number of options available:

Pressing GAMBLE initiates Odds Gamble.

Pressing TAKE WIN transfers win to the Credit meter and the "Press DEAL to begin" message appears. Note that the card(s) from the last game played remain face up until the player presses DEAL or changes the number of card selection.

Pressing DEAL takes the win, deals a new card and decrements the Credit meter by the same amount that had been staked in the previous game. The "Choose RED or BLACK" message appears.

Pressing a BET button, CHOOSE CARD button, RED or BLACK takes the win and brings up the "Press DEAL to begin" message. The bet amount message is to update if a bet key was pressed. The card display is to update if a different number of cards has been selected.

Figure 8:
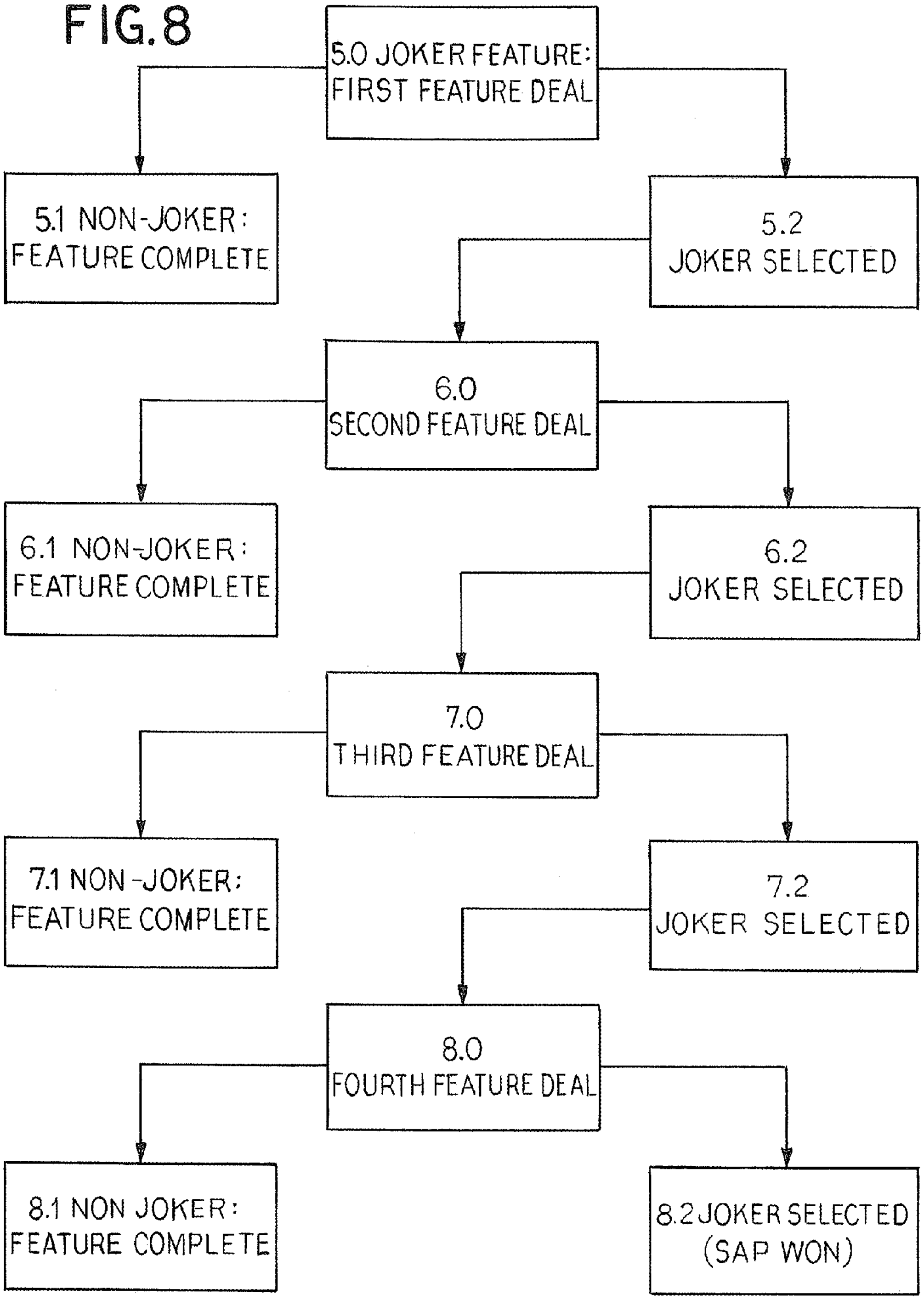

The feature game, triggered by the occurrence of one or more Joker Triggers during the base game, operates as follows (see FIG. 8). Note, during the feature games the player is required to draw jokers to advance in the feature game, and the selection of a red or black card in any draw ends the feature. A first joker is awarded to the player simply by being awarded the feature outcome. Three jokers awards the player 10 credits×number of triggers, four jokers awards the player 30 credits×number of Joker Triggers, and five jokers awards the player the jackpot. The ratio of jokers to red and black cards is varied during the feature games, as outlined below. Where the player is drawing for a fifth joker (that is, drawing to win the jackpot), the ratio of jokers to red and black cards is selected so that the player's chance of winning the jackpot is proportional to the size of the wager in the base game. This is explained in more detail below.

During the feature the screen changes colour and the Red/Black graphical area changes to the 5-joker display. The leftmost joker is to be bright (since the player already has the first of 5 jokers necessary to win the Jackpot). If the feature has been won with a single Feature Trigger, then any onscreen Feature Trigger display should disappear.

If, however, the feature has been won with two or three Feature Triggers, then the onscreen Feature Trigger display should remain until the feature is completed (any credit wins during the feature are multiplied by the number of Feature Triggers).

During the feature game three cards are dealt from a modified deck of cards. The manner in which the deck is modified is described below.

The three CHOOSE CARD buttons flash. The player chooses one of the three cards to be revealed.

Note that after each card selection during the feature, the selected card turns over and non chosen cards are displayed in a greyed-out manner.

If a non-joker is selected the game is over. Game screen is to return to start.

If, however, the player had a win during the feature game, then the player is invited to gamble the win, in the manner described above.

Note that during the feature all jokers selected give an improvement—Red/Black choice no longer applies. If a joker is selected, the second joker on the 5-joker display is to become bright (along with the first).

The player is then invited to make a further selection to attempt to draw a third joker. If a third joker is selected a special win tune is played and the third joker on the 5-joker display is to FLASH, emphasising that the player has won 10 credits. (Feature credit wins are multiplied by the bet per card and by the number of Feature Triggers.)

If on the next deal a non-joker is selected, the game is over. The feature win is 10 credits times the bet per card times the number of Feature Triggers. For example, if the player played two cards in the base game and drew two Joker Triggers, then the feature win would now be 20 credits times the bet per card.

The following information is to be displayed graphically onscreen:

| | |
|---|---|
| Feature win: | 10 |
| Number of Feature Triggers: | Z |
| Total Win: | (Z × 10) |

The player is then invited to select a card in an attempt to select a fourth joker.

If a fourth joker is selected, the fourth joker on the 5-joker display is to FLASH, emphasising that the player has won 30 credits.

If in the fourth deal of the feature game a non-joker is selected, the game is over. The fourth joker feature win is 30 credits times the bet per card times the number of Feature Triggers. For example, if the player played three cards in the base game and drew three triggering jokers, then the feature win would now be 90 credits times the bet per card.

The player is then invited to draw a fifth joker during the fourth draw of the feature game. If on the fourth draw of the feature game a joker is selected a special win tune is played and the fifth joker on the 5-joker display flashes, emphasising that the player has won the Jackpot (jokers 1-4 would already be bright). The jackpot amount should also flash and Jackpot win sound is to play.

The Credit meter should then begin incrementing with the jackpot amount. If the player had no wins from the base game, the following messages display, with relevant buttons flashing:

| | |
|---|---|
| Message line 1 | JACKPOT Won, zz Credits |
| Message line 2 | Game Over/x credits per card |

Note that the jackpot is unavailable for Gamble. Once the jackpot win has finished incrementing, the game screen is to return to its start configuration.

Reference may now be made to FIGS. 9 to 14 of the drawings. These illustrations depict a typical layout of a screen for a gaming machine on which the game according to certain embodiments of the invention is played. The game will be typically played in accordance with the flowcharts set out in FIGS. 6 to 8 and the attached screens depict one form in which the game may be implemented.

Figure 9:
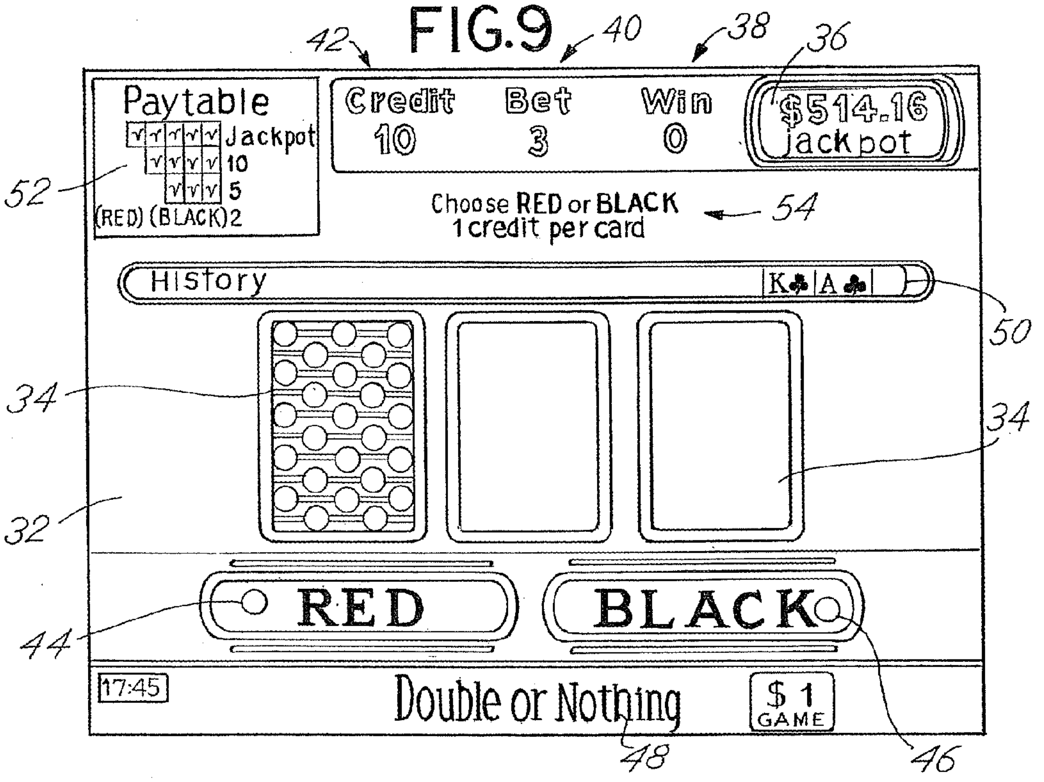
FIGS. 9 to 14 show illustrations of display screens of a gaming machine according to certain embodiments of the invention.

Turning initially to FIG. 9, a screen 32 is shown which includes the following features. Firstly, the screen depicts three card positions 34 in which cards are dealt at the start of each new game. As shown in FIG. 9, there are 3 card positions that the player is entitled to play one card, two cards or three cards in the manner described above. In addition, the player is entitled to bet 1 to 5 credits on each card and thus for each particular game there is a maximum 15 credit bet. Clearly, other bet configurations are possible and, indeed, it would be possible to have a game of more than 3 positions and specifically envisaged is a 5 position game. The screen also includes a jackpot meter 36, a win meter 38, a bet meter 40, and a credit meter 42. The jackpot is a stand alone progressive jackpot and will typically be one where the player draws 5 jokers in the manner described above. A portion of each bet made will go to increase the progressive jackpot. The screen itself is preferably a touch screen type screen and the player is able to touch the screen in order to select either a red card with red button 44 or a black card with black button 46. The screen is also provided with a double or nothing touch region which will light up when the player is invited to gamble any win made on the machine.

The machine also includes a history bar 50 which will depict cards previously drawn, and a paytable layout 52.

FIG. 9 shows the typical screen after a player has elected to play a single card and that card has been dealt, face down. An alternative display would be that shown in FIG. 10 wherein the single card selected is shown in the centre of the screen, that is, the non-selected positions are not shown.

Figure 10:
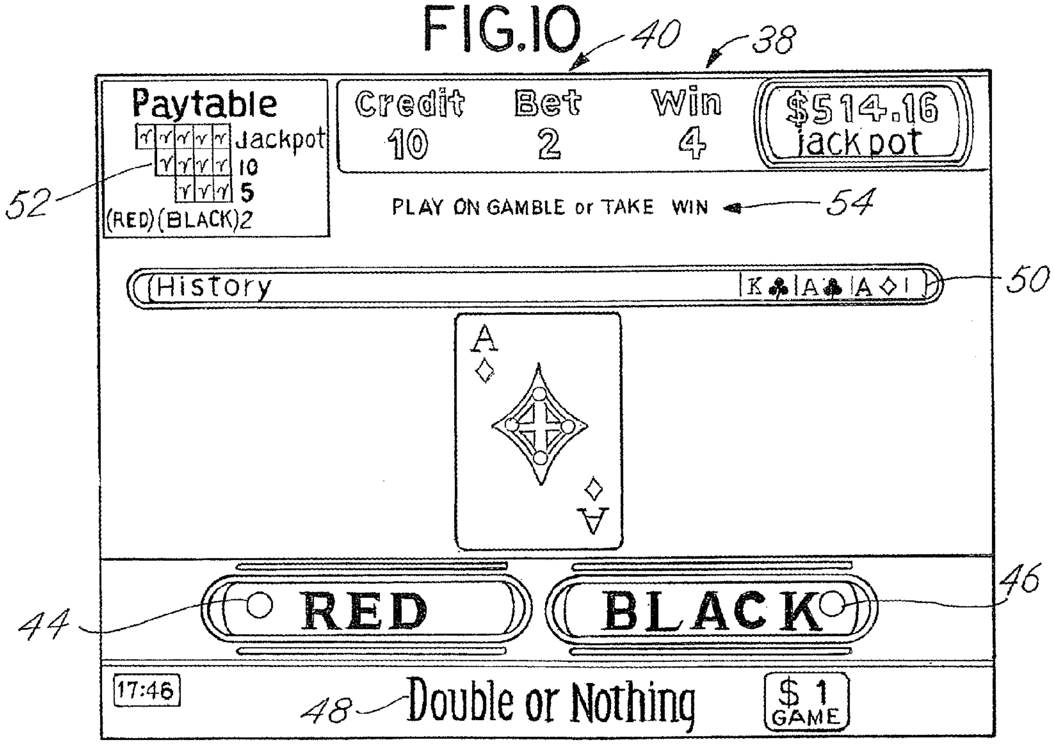
Figure 11:
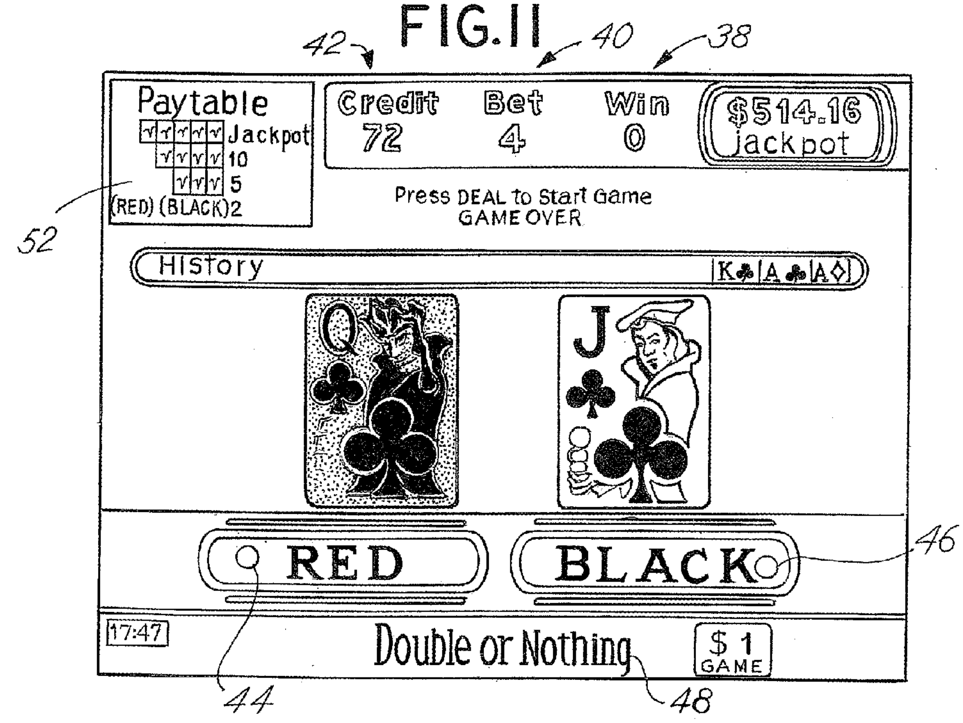

As discussed above, once the card has been dealt face down, the player is invited to press either the red button or the black button. FIG. 10 illustrates what happens when the player has selected correctly, that is, the player selected a red card by pressing the red button portion of the touch screen, and a red ace of diamonds was turned up thus the player is awarded a win of 4 credits for a bet of 2 credits. The player is, at this point, invited to either play on, gamble or take the win with these options being set out in a dialogue or message portion of the screen indicated at 54. If, as shown in FIG. 11, the player has selected a red card but a black card was turned over, the player would not win anything, resulting in a 0 win for a 4 credit bet per card game. FIG. 11 illustrates a screen when the player is playing 2 cards.

As mentioned above, it is envisaged that the cards in the base game will comprise a standard deck of 52 cards, that is, 26 red cards and 26 black cards. In addition, there will be a series of jokers and, depending on the manner in which the card game is to be played. The ratio of jokers to red and black cards will be the same for each base game, but can vary during the feature game. Variation of the number of jokers can be used to vary the return to player percentage.

As mentioned above, if during the play of the base game a player selects a joker which has the same colour as the colour selection during the base game, then the player is awarded a feature outcome. The selection of the correct coloured joker is thus the Feature Trigger for the feature outcome. Since in the base game the player is able to select 1, 2 or 3 cards, it is possible that the player can receive 1, 2 or 3 Feature Triggers. The number of Feature Triggers which the player receives has a multiplier effect on any wins (minor or major feature prizes for 3 or 4 jokers respectively) for the player during the first portion of the feature game.

Figure 12:
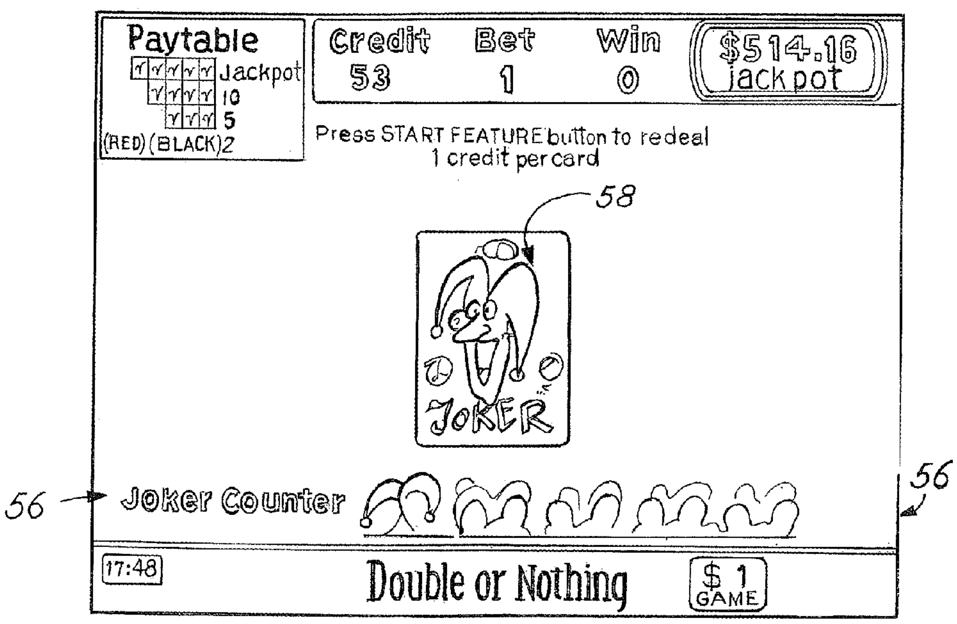
Figure 13:
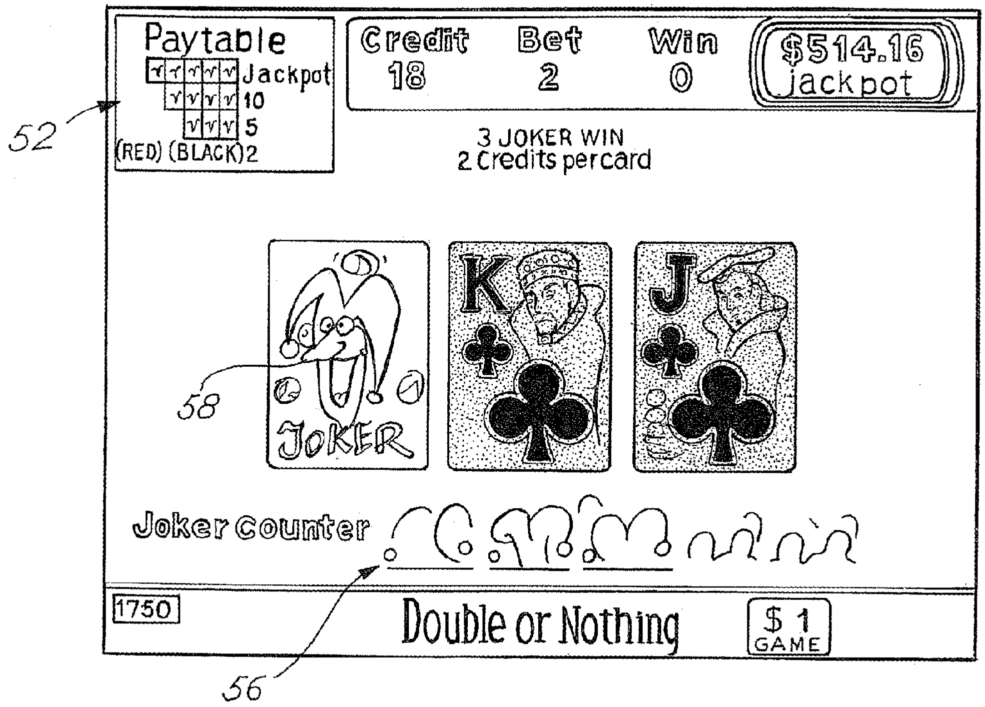
Figure 14:
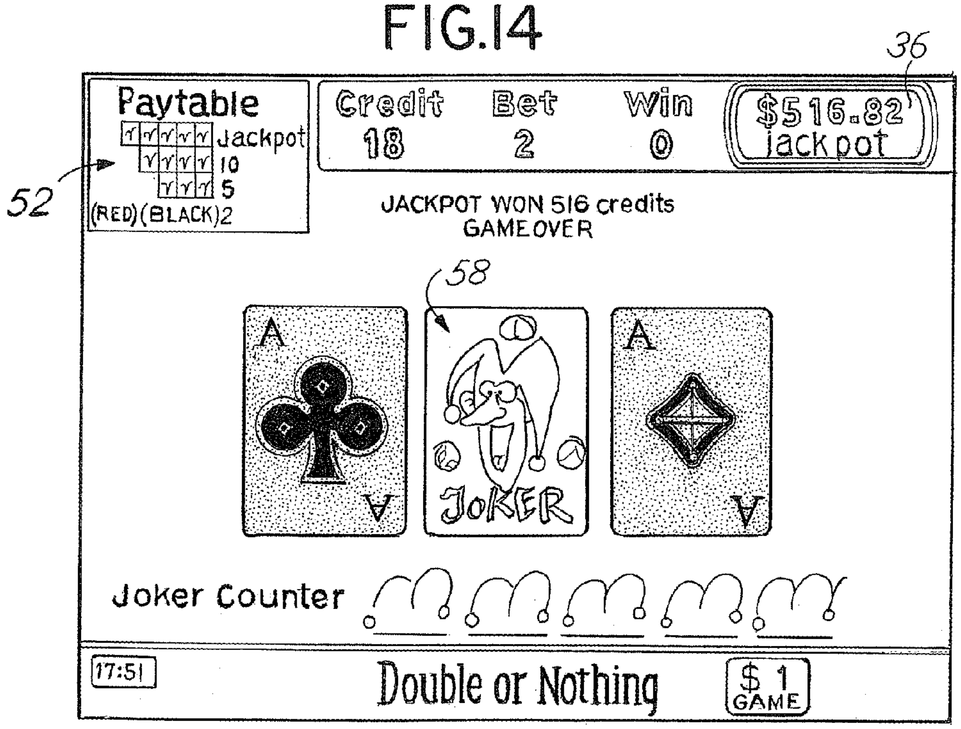

The point of the feature game is to draw jokers 58. FIG. 12 depicts the feature screen. It will be noted that the feature screen includes a joker counter section 56 which indicates how many jokers have been drawn during the feature game. The joker counter section 56 initially has a single joker since the player is awarded a joker for having drawn at least one joker during the base game. Thereafter the feature involves drawing at least 1 and a maximum of 4 further cards with the game being ended if on any draw a red or black card is drawn. FIG. 13 depicts a screen where a third joker 58 has been drawn, and the joker counter indicates that 3 jokers have been collated entitling the player to win the minor feature prize, which in this embodiment is 5 credits×number of triggers×credits bet per card. FIG. 14 depicts a screen when the jackpot prize 36 has been won by drawing a fourth joker 58 in a row, to go with the joker that the player was awarded initially as a consequence of having drawn a joker during the base game. Five jokers in total have thus been drawn in order to win the jackpot, as indicated by the joker counter 56.

Set out below is a table which shows the card configurations that is, the number of red cards, black cards, and jokers for the different stages of the game. In this particular variation, the return to player percentage of the machine is intended to be 88.28%. Clearly, by varying the number of jokers in the game, in any deal of the game, the return to player percentage will be varied. Thus, if it was desired to increase the return to player percentage, the number of jokers in the base game could be decreased. The frequency of the jackpot wins can also be varied by varying the number of jokers and/or the number of red and black cards in the deck.

In the table set out below, deal 1 represents the card configuration for the base game, deal 2 represents the card configuration for the first deal of the feature game, deal 3 depicts the card configuration for the second deal of the feature game, deal 4 indicates the card configuration for the third deal of the feature game, and deal 5 depicts the card configuration for the fourth deal of the feature game.

It will be noted that deal 5 configurations vary, depending on the number of credits bet on the base game. There are 11 possible bet configurations in the base game, and thus 11 possible card configurations for the draw of the jackpot card. Thus, where only a single credit has been bet on one card in the base game the deal (referred to as "Mult 1" in the table) has 9 red cards, and 9 black cards, and one joker. Thus, the possibility of the player drawing a joker in this deal would be 1 in 19.

Where the player has bet the maximum bet, that is, a total of 15 credits which is the last deal ("Mult 15") in the table, the player has a far higher chance of being awarded the jackpot. In this situation the deck from which the player draws a card comprises 2 red cards, 2 black cards, and 15 jokers. Thus, in this situation, the player who has bet 15 credits in the base game has a 15 in 19 chance of selecting a joker which is a far higher percentage than the situation if only a single credit is bet. The net effect is the chance of winning the jackpot per credit bet is the same for all bet configurations in the base game.

Thus, by varying the card decks for the last or "jackpot" deal the player who plays the maximum credit game has a far higher chance of winning the jackpot, than the player who plays only a single credit, but the chance per credit bet is the same for all bet configurations.

| Var. 99 88.28% | Deal 1 | Deal 2 | Deal 3 | Deal 4 | Deal 5 (Mult 1) | Deal 5 (Mult 2) | Deal 5 (Mult 3) | Deal 5 (Mult 4) | Deal 5 (Mult 5) | Deal 5 (Mult 6) | Deal 5 (Mult 8) | Deal 5 (Mult 9) | Deal 5 (Mult 10) | Deal 5 (Mult 12) | Deal 5 (Mult 15) |
|---|---|---|---|---|---|---|---|---|---|---|---|---|---|---|---|
| Red Cards | 26 | 26 | 26 | 26 | 9 | 8 | 8 | 7 | 7 | 6 | 5 | 5 | 4 | 3 | 2 |
| Black Cards | 26 | 26 | 26 | 26 | 9 | 9 | 8 | 8 | 7 | 7 | 6 | 5 | 5 | 4 | 2 |
| Jokers | 9 | 10 | 10 | 7 | 1 | 2 | 3 | 4 | 5 | 6 | 8 | 9 | 10 | 12 | 15 |

Of course the game need not be played with cards in the manner described above, and need not be played with a standard deck of cards where cards are used to define the symbols. Other variations are also possible, for example, a variation might be a spinning coin with heads and tails, in which the feature outcome occurs when the coin say, lands on its edge, or otherwise does not present a head or tails outcome. Likewise, there may be many different forms of symbol selection mechanisms or devices which would be mathematically equivalent to the card game described herein. Other symbols could be die, reels, counters, non-standard cards, and the like. The form of the symbols are thus not particularly significant although, of course, players understand cards well and are generally comfortable with concepts such as selecting red or black from a deck of cards. It is thus envisaged that card selection will be a popular form of the game.

The base game described herein above may itself be a game triggered from another game. The wager placed in the base game may be able to be set individually of that other game, or imported from the other game, for example dependent on the wager made in the other game or the prize attributable to trigger event in the other game.

While the foregoing description has been provided by way of example of the preferred embodiments of the present invention as presently contemplated, which utilise gaming apparatus and machines, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

The invention claimed is:

1. A gaming machine for playing a wagering game, the gaming machine comprising:

a credit input mechanism configured to receive a physical item representing a monetary value for establishing a credit balance, the credit balance being increasable and decreasable based at least on wagering activity;

an output mechanism configured to provide payouts to a player;

a first set of symbols comprising a plurality of standard symbols and a plurality of special symbols, the number of standard symbols to the number of special symbols forming a ratio;

a game controller configured, in accord with a wager made from the established credit balance, to a) play said wagering game comprising a base game, b) randomly select a symbol from the first set of symbols during said play of said base game, and c) to maintain said ratio at a fixed value for the base game;

a display having a plurality of display positions, and configured to display said selected symbol in a non-revealed manner in one of said display positions; and a symbol characteristic nominator being player-actuatable to nominate at least one characteristic of a symbol; and wherein said game controller is further configured to reveal the characteristic of the selected symbol after said nomination; and wherein said display is further configured to display the selected symbol in a revealed manner; and wherein said game controller is further configured to, in response to the revealed selected symbol being a special symbol having the nominated characteristic, award a feature game comprising a plurality of bonus plays, and wherein in the feature game, a) said game controller is further configured to vary said ratio of said first set of symbols to form a second set of symbols and to select a plurality of symbols from said second set of symbols during said play of a said bonus play of said feature game, b) said display is further configured to display the selected symbols in a non-revealed manner in a plurality of the symbol positions, c) said symbol position nominator is player-actuatable to nominate one of the symbol positions, and d) said game controller is further configured to progress said feature game to a next bonus play in the plurality of bonus plays dependent on the nominated symbol position having a special symbol.

2. The gaming machine of claim 1, and further including a jackpot prize; and wherein said game controller is configured to award said jackpot prize if special symbols are selected in n consecutive bonus plays.

3. A method of providing a wagering game on a gaming system having a credit input mechanism configured to receive a physical item representing a monetary value for establishing a credit balance, the credit balance being increasable and decreasable based at least on wagering activity, an output mechanism configured to provide payouts to a player, a game controller and using a plurality of symbols comprising a plurality of symbols with characteristics that match one at least two possible selections and at least one trigger symbol, and a number of the symbols to a number of the at least one trigger symbol forming a ratio, the method comprising:

establishing a credit balance via said credit input mechanism receiving the physical item;

commencing, in accord with a wager made from the established credit balance, a game play by receiving the wager staked on the outcome of the wagering game;

maintaining via the game controller the ratio at a fixed value for the wagering game;

selecting via the game controller a symbol characteristic from at least two possible selections of a characteristic of a symbol;

selecting via the game controller a symbol from the plurality of symbols; and displaying on said display the selected symbol after the selecting of the symbol characteristic;

if the selected symbol is a trigger symbol having the selected characteristic, then providing via the game controller a feature game, said providing a feature game including a) varying via the game controller said ratio between said number of symbols and said number of at least one trigger symbol and forming a different set of symbols including at least one progression symbol;

b) selecting via the game controller a symbol from the different set of symbols according to random criteria;

c) displaying on said display the selected symbol of the different set of symbols; and d) repeating via the game controller step a) if a progression symbol is displayed, until either a progression symbol is not revealed, or until n cycles of step a) have been completed, where n is a fixed number and is at least 2;

e) ending via the game controller the current game play if a progression symbol is not revealed or n cycles have been completed;

f) awarding via the game controller an award;

if the selected symbol of the different set of symbols is a trigger symbol but does not have the characteristic that matches the characteristic received from the player, not providing the feature game to the player; and if the selected symbol is not a trigger symbol and has characteristics that match the characteristic received from the player, awarding via the game controller an award to the player.

4. A method of providing a wagering game on a gaming system having a credit input mechanism configured to receive a physical item representing a monetary value for establishing a credit balance, the credit balance being increasable and decreasable based at least on wagering activity, an output mechanism configured to provide payouts to a player, a game controller and using a plurality of symbols comprising a plurality of symbols with characteristics that match one at least two possible selections and at least one trigger symbol, and a number of the symbols to a number of the at least one trigger symbol forming a ratio, a game controller and using a plurality of symbols, comprising:

establishing a credit balance via said credit input mechanism receiving the physical item;

commencing, in accord with a wager made from the established credit balance, a game play by receiving the wager staked on the outcome of the wagering game;

maintaining via the game controller the ratio at a fixed value for the wagering game;

selecting via the game controller a symbol characteristic from at least two possible selections of a characteristic of a symbol;

selecting via the game controller a symbol from a set of the plurality of symbols; and displaying on said display the selected symbol after the selecting of the symbol characteristic;

if the selected symbol is a trigger symbol having the selected characteristic, then:

a) varying via the game controller said ratio between said number of symbols and said number of at least one trigger symbol and forming a different set of symbols including at least one progression symbol;

b) selecting via the game controller symbols from a plurality of symbols including at least one progression symbol, according to random criteria;

c) displaying on said display a plurality of choices, each choice associated with a selected symbol;

d) receiving via the game controller a selection of one of the choices;

e) revealing on said display a symbol associated with the one choice of the different set of symbols;

f) if a progression symbol is revealed, repeating steps a) through e) until either a progression symbol is not revealed, or until n cycles of steps a) through e) have been completed, where n is a fixed number and is at least 2;

g) ending via the game controller the current game play if a progression symbol is not revealed, without awarding a jackpot prize; and h) ending via the game controller the current game play if n cycles have been completed, and awarding a jackpot prize;

if the selected symbol of the different set of symbols is a trigger symbol but does not have the characteristic that matches the characteristic received from the player, no feature game is provided to the player; and if the selected symbol is not a trigger symbol and has characteristics that match the characteristic received from the player, awarding via the game controller an award to the player.

5. The method of claim 4 wherein the step of commencing a game play by receiving from a player a wager staked on the outcome of the wagering game and a selection from at least two possible selections for a characteristic of a symbol that forms part of the wagering game and the step of selecting a symbol from a set of a plurality of symbols that comprises symbols with characteristics that match one or other of the at least two possible selections and comprises at least one trigger symbol, and displaying each selected symbol after the selection of a characteristic has been received from the player are both repeated a plurality of times.

* * * * *